(12) United States Patent
Knox

(10) Patent No.: US 8,740,526 B2
(45) Date of Patent: Jun. 3, 2014

(54) LOAD BEAM ASSEMBLY

(71) Applicant: Ancra International LLC, Azusa, CA (US)

(72) Inventor: Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 14/055,290

(22) Filed: Oct. 16, 2013

(65) Prior Publication Data

US 2014/0119848 A1 May 1, 2014

Related U.S. Application Data

(60) Provisional application No. 61/718,702, filed on Oct. 25, 2012.

(51) Int. Cl.
*B60P 7/08* (2006.01)

(52) U.S. Cl.
USPC ............................. 410/145; 410/144; 410/150

(58) Field of Classification Search
CPC .......... B60P 7/0892; B60P 7/135; B60P 7/15; A47H 1/022; E04G 25/04; E04G 25/06
USPC ........... 410/43, 143, 144, 145, 146, 147, 148, 410/149, 150, 151, 89; 211/105.3; 248/354.1, 354.6
See application file for complete search history.

(56) References Cited

U.S. PATENT DOCUMENTS 5,104,269 A * 4/1992 Hardison ...................... 410/149

OTHER PUBLICATIONS

Kinedyne.com/products/127/k1-kaptive-beam-html;Apr. 27, 2012, pp. 1-5.
www.ancra.com; Catalog No. 210E, pp. i-ii and 33-37.
U.S. Appl. No. 13/658,515, filed Oct. 23, 2012, Knox.

* cited by examiner

Primary Examiner — Stephen Gordon
(74) Attorney, Agent, or Firm — Brinks Gilson & Lione

(57) ABSTRACT

An elongate beam assembly for supporting cargo is provided. The beam assembly includes an elongate beam extending between first and second ends, the beam comprising a bottom wall with a downward facing surface and extending across a bottom width. A top wall includes an upwardly facing surface and extends across a top width between right and left edges and opposite right and left side walls extend between the bottom and top walls. The bottom width is smaller than the top width. Each of the right and left edges of the top wall define respective right and left side surfaces. Right and left ribs extend from a bottom edge of each respective right and left side surface to the respective right and left side wall.

15 Claims, 4 Drawing Sheets

LOAD BEAM ASSEMBLY

CROSS-REFERENCE TO RELATED APPLICATIONS

This application claims priority from U.S. Provisional Application No. 61/718,702, filed on Oct. 25, 2012, the entirety of which is fully incorporated by reference herein.

TECHNICAL FIELD

This disclosure relates to storage units, such as wheeled trailers and, more particularly, to a load beam assembly that is operably mounted within a space defined by such a storage unit to define a cargo support above a floor on the storage unit.

It is known to utilize load beams in storage spaces in trailers on commercial vehicles to provide an additional support level for cargo between the floor and roof bounding such cargo spaces. An exemplary structure is shown in U.S. Pat. No. 6,364,583 (the '583 patent). The '583 patent discloses a load beam assembly of the type that is utilized in a commercial system identified by the owner herein as its "Lift-A-Deck®" system.

With the load beam assembly in the '583 patent, substantial flexibility is afforded in terms of varying the height and front-to-rear location of one or more load beams. Cargo can be spanned directly across two or more of such load beams or, alternatively, elongate supporting components may bridge adjacent load beams to cooperatively produce a subjacent support surface for cargo. The latter arrangement potentially reduces the number of load beams that must be utilized and has particular utility for cargo with a smaller footprint and that which needs a more significant contact area to be stably supported in the space.

BRIEF SUMMARY

A representative embodiment of the disclosure is provided. The embodiment includes an elongate beam assembly for supporting cargo is provided. The beam assembly includes an elongate beam extending between first and second ends, the beam comprising a bottom wall with a downward facing surface and extending across a bottom width. A top wall includes an upwardly facing surface and extends across a top width between right and left edges and opposite right and left side walls extend between the bottom and top walls. The bottom width is smaller than the top width. Each of the right and left edges of the top wall define respective right and left side surfaces. Right and left ribs extend from a bottom edge of each respective right and left side surface to the respective right and left side wall.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
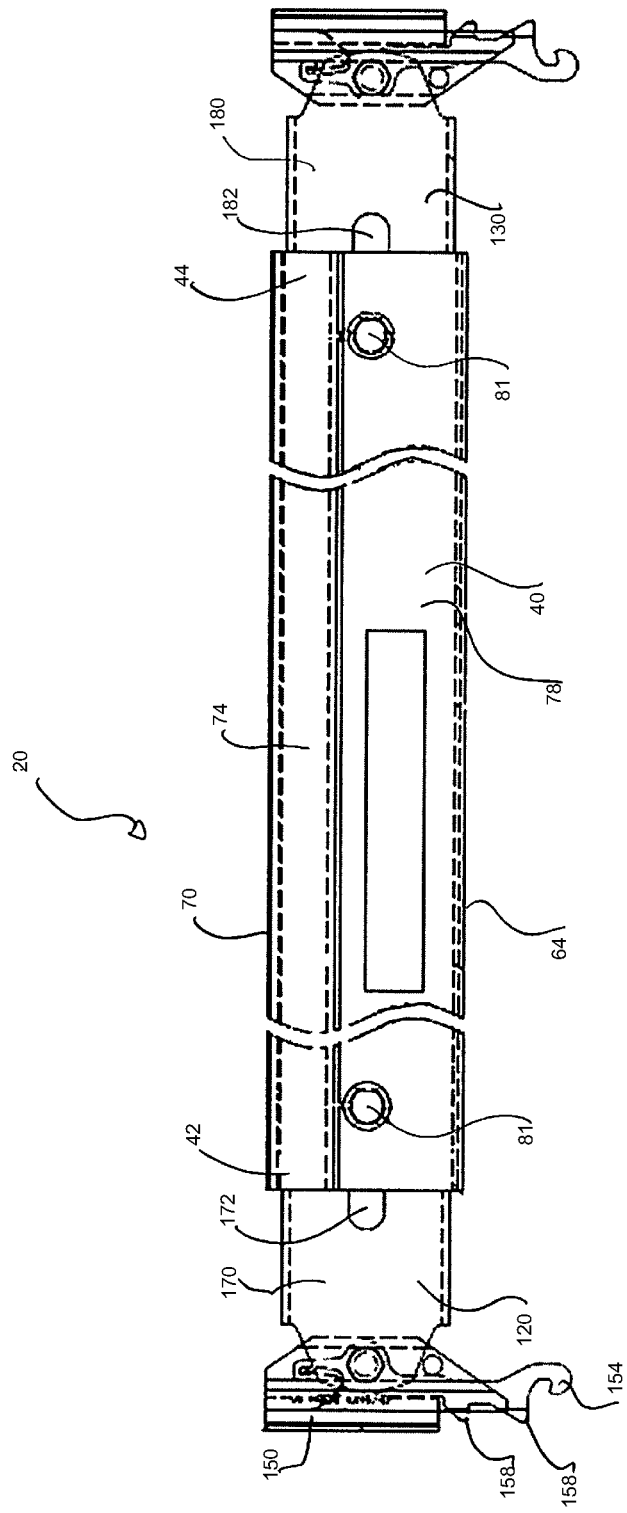
FIG. 1 is a side view of a beam assembly.
Figure 2:
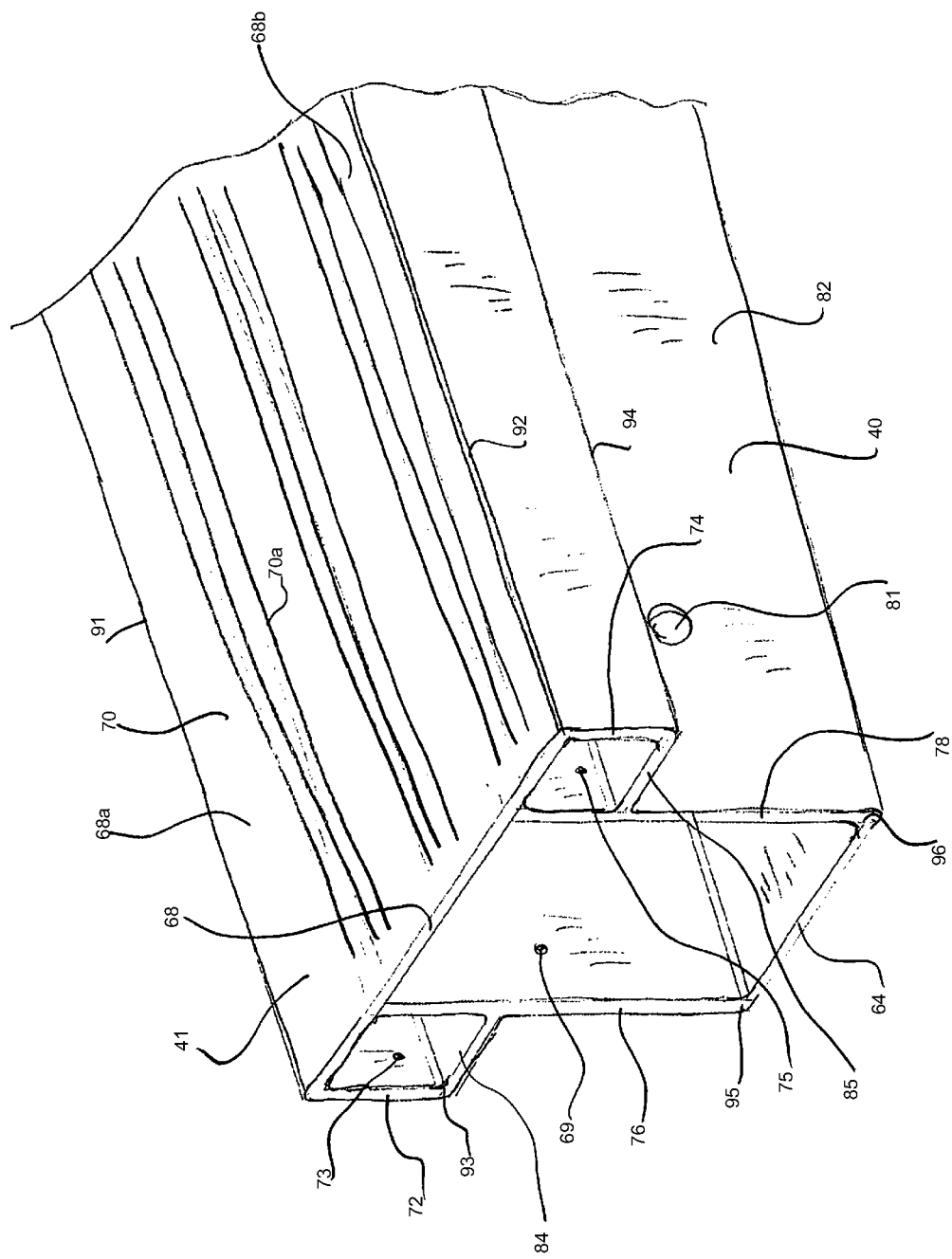
FIG. 2 is a perspective view of a first side portion of a beam usable within the beam assembly of FIG. 1.
Figure 4:
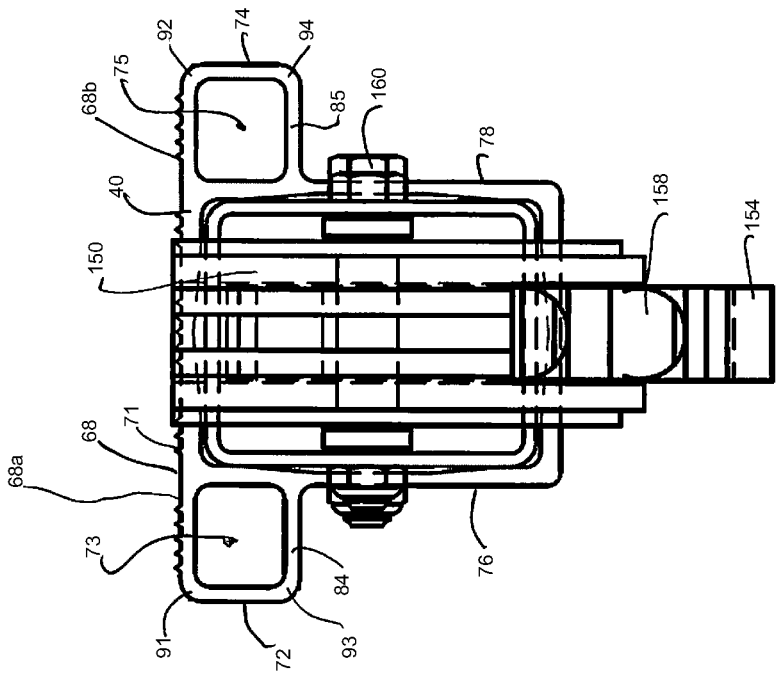
FIG. 4 is an end view of the beam assembly of FIG. 1.
Figure 5:
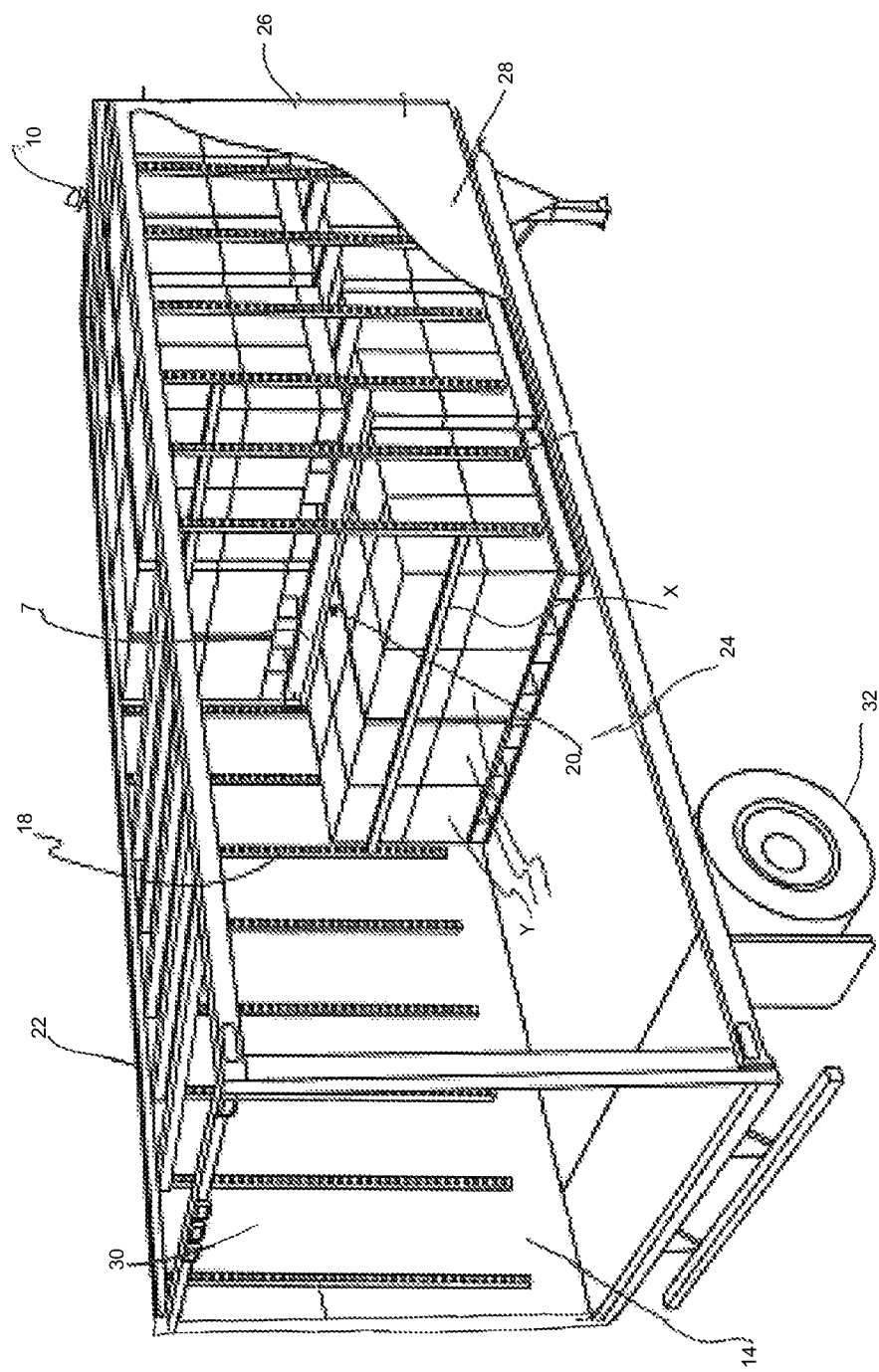
FIG. 5 is a schematic representation of a storage unit into which one or more beam assemblies may be used

FIG. 5 depicts, a generic environment for use of one or more beam assemblies 20 for supporting cargo disposed within a storage compartment, such as a cargo compartment 10 of a truck. The storage unit 10 has a wall structure 12 bounding a storage space 14 for the placement of objects to be stored. Within the storage space 14, a plurality of spaced supports 16, 18 is provided. The supports 16, 18 engage and support one or more beam assemblies 20 to maintain the beam assemblies 20 in an operative position within the storage space 14. In some embodiments, two or more beam assemblies 20 (the rearward beam assembly 20 annotated by element Z) may be horizontally aligned to provide vertical support for cargo disposed thereon, either directly thereon, or disposed upon pallets which are disposed directly upon the beam assemblies 20. As shown schematically as X, another beam assembly 20 may be positioned horizontally offset and vertically above the two or more aligned beam assemblies 20 (Z) to contact a side surface of the cargo Y disposed upon the support beam assemblies 20 to provide horizontal support for the cargo Y to prevent the cargo from sliding during movement, and especially acceleration and deceleration of the cargo compartment. As discussed herein, the design of the beam 40 used with the beam assembly 20, and particularly the side respective right or left side surface 76, 78 (best shown in FIGS. 1 and 2) that contacts the cargo W provides for a large surface area for contact with the cargo W to minimize damage to the cargo W during transportation.

The generic showing of the storage unit 10 is intended to encompass a number of different structures in different environments in which the beam assembly 20 has application. For example, the storage unit 10 may be one that is stationary or one that is transportable, such as the exemplary form described herein below.

The storage unit 10 may have the aforementioned wall structure 12, which is made up of a roof/top wall 22, a floor 24, a front wall 26, and spaced side walls 28, 30 that collectively bound the storage space 14. A wheeled chassis 32 may support the rear region of the storage unit/trailer 10. A rear access opening 34 may be provided to allow access to cargo Y disposed therein and to allow access to install, move, and remove the one or more beam assemblies with respect to the supports 16, 18, normally installed (either horizontally or vertically, normally with a plurality of supports 16, 18 upon each wall to provide a multitude of potential positions for the beam assemblies 20 as appropriate based upon the cargo Y to be stored therein) within the storage unit 10. The access opening may be selectively blocked by a pair of doors 38 (portion of one shown).

The supports 16, 18 for the load beam assembly 20 are provided on opposite side walls 28,30 and may be disposed in a paired relationship and may be disposed at regular intervals in a fore-and-aft direction. Each of the supports 16, 18 has the same construction and is in the form of an elongate, vertically extending track with openings 39 at regular intervals along the lengthwise extent thereof.

Figure 3:
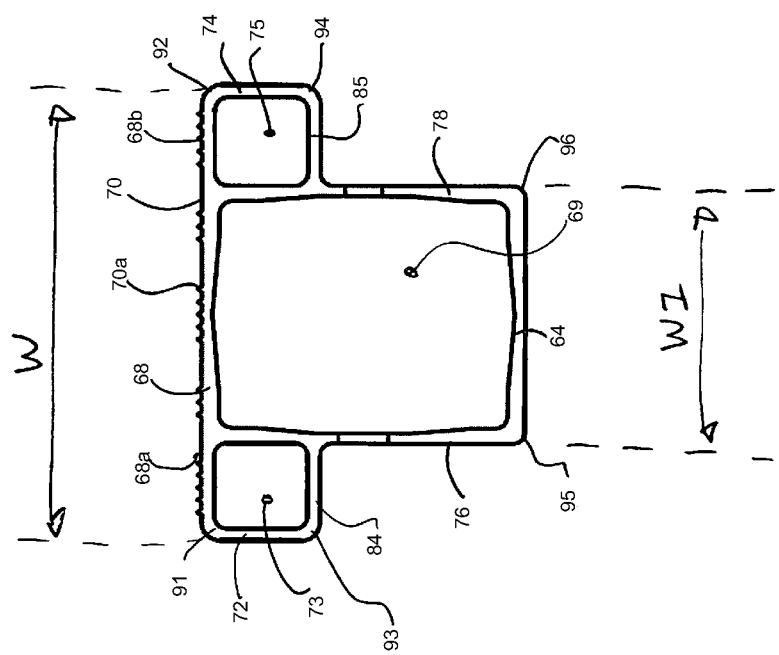
FIG. 3 is an end view of the beam of FIG. 2.

Turning now to FIGS. 1-4, a beam assembly 20 includes an elongate central beam 40 that extends between spaced first and second ends 42, 44, with a top surface 68 (or vertical load carrying surface) that extends along a width W along its length (as shown in FIG. 3).

The beam assembly 20 additionally telescopingly receives tube 170, 180 of each of first and second connector assemblies 120, 130 within the central bore 69 and apertures formed on both opposite ends 42, 44 of the beam 40 to allow communication through each end into the central bore 69.

The connector assemblies 120, 130 each may have the same construction. The connector assemblies 120, 130 normally each include a locking structure, such as central rib 150 to fit within a central slot in a support 16, 18, and a pivotable shoe 154 that includes one or more pegs that fits within corresponding holes in the support. The connector assemblies 120, 130 each may include a tube 170, 180 connected to locking structure, with the tube 170 configured to tightly slide within the central bore 69 of the beam 40. The locking structures 120, 130 depicted in FIGS. 1 and 4 and described herein are exemplary and one of skill in the art will understand upon review and contemplation of this disclosure that other structures may be used with the beam 40 to form the beam assembly 20, and to provide suitable structures to provide or vertical support to cargo disposed in conjunction with the beam assembly 20.

The interaction between the connector assemblies 120, 130 and supports 16, 18 may be, for example, as depicted in either U.S. Pat. No. 6,364,583 or 6,074,143 for similar structures disclosed in these patents. The disclosure in each of these patents is incorporated herein by reference.

The elongate beam 40 has a bottom wall 64 with a downwardly facing surface 66 with a width W1. The elongate beam 40 further has a top wall 68 having an upwardly facing surface 70. The upwardly facing surface 70 has a corresponding width W between laterally spaced first and second side edges 72, 74. In some embodiments, the top wall 68 may be formed with a textured surface 71, such as a surface with a plurality of parallel ridges and grooves along its length, a roughened surface, or something similar. The textured surface is provided to maximize the friction between the beam 40 and cargo Y disposed thereon, to minimize sliding during transport.

The elongate beam 40 further has laterally spaced right and left side walls 76, 78 with oppositely facing, substantially flat surfaces 80, 82, respectively. The cross-sectional shape of the elongate beam 40 is symmetrical about a vertical plane extending through the center of the beam 40. In some embodiments, the beam 40 is symmetrical about the entire length of the beam 40, while in other embodiments, the beam 40 may be symmetrical along only certain portions, such as along a center portion, or along one or both end portions 42, 44.

More specifically, the top wall 68 extends horizontally (when the beam 40 is aligned in the normal orientation) and is disposed on top of the right and left side walls 76, 78. The top wall 68 may be disposed with right and left extensions 68a, 68b that extend outwardly of the right and left side walls 76, 78. The right and left extensions 68a, 68b are each supported by respective right and left side surfaces 72, 74, and respective right and left ribs 84, 85. The combined right extension 68a, right side surface 72, right rib 84, and right side wall 78 each combine to define a box-like structure, with a hollow portion 73 therewithin. Similarly, in some embodiments, the left extension 68b, left side surface 74, left rib 85, and left side wall 78 each combine to define a box-like structure with a hollow portion 75 therewithin. In some embodiments, box-like structures may be formed on both the right and left sides of the beam 40, while in other embodiments, a box-like structure may be formed on only one of the right or left sides of the beam 40.

One of ordinary skill in the art will appreciate upon review of the disclosure and figures, that the presence of one or both of the right and left side surfaces 72, 74 extending downwardly from the respective outer edges 91, 92 of the top surface 68 provides several benefits to the beam 40. Initially, the presence of the right and/or left side surfaces 72, 74 (instead of edges corresponding to the thickness of the top surface 68 as found in other beam designs) provides for a large surface area on the side of the beam 40 that engages cargo disposed proximate to the beam 40 (when the beam 40 is positioned to provide horizontal support to the cargo Y), which minimizes any potential for damage to the cargo due to cutting by the beam 40, due to the distribution of force applied to the cargo over a relatively large surface area of the side surface (72 or 74) contacting the cargo Y.

Further, the strength of the beam 40 is improved by the presence of the side surface(s) 72, 74 and the rib(s) 84, 85 that connect a bottom edge 93, 94 of the respective right or left side surface 72, 74 to the respective right or left side wall 76, 78. The ribs 84, 85 each prevent the side surface from bending inward in situations where cargo Y may impact the side surface (72, 74) near the bottom edge (93, 94).

In some embodiments, the right and left side surfaces 72, 74 may have a height that is about 25% to about 40% of the overall height of the beam 40 (measured from the bottom surface 64 to the top surface 68). In some exemplary embodiments, the right and left side surfaces 72, 74 may be about 1 inch, with the overall height of the beam 40 being about 3.25 inches. Other dimensions (and relative sizes) may be appropriate based upon the desired design of the beam 40, as will be understood by one of ordinary skill in the art upon a review of this specification and figures.

In some embodiments, the beam 40 may telescopingly receive a tube 170, 180 of the respective first or second connector assembly 120, 130. The tube 170, 180 may be configured to tightly but slidingly slide within central bore 69 of the beam 40. Each tube 170, 180 may include a slot 172, 182 that is aligned with a hole 81, which extends through both right and left side walls 76, 78 of the beam 40, and which are disposed proximate each of the first and second ends 42, 44 of the beam 40 and positioned in registry with the respective slot 172, 182 of the tube 170, 180. When the beam assembly 20 is positioned to the desired length (which allows both opposite connector assemblies 120, 130 to connect with opposite supports 16, 18), fasteners 160 may be fed through the hole 81 and the respective slot 172, 182 and tightened to maintain the relative position between the respective connector assembly 120, 130 and the beam 40. In some embodiments, the holes 81 are disposed below the respective right and left side surfaces 72, 74 to minimize the size of the fasteners 160 needed, and to prevent any unnecessary stresses from being applied to the right and left side surfaces 72, 74.

In some embodiments, one or both of the edges 91, 92 between the top wall 68 and the respective right or left side surface 72, 74 and/or one or both of the respective edges 93, 94 between the respective right or left side surface 72, 74 and the respective right or left rib 84, 85 may be chamfered or rounded (or otherwise curved) in order to minimize any sharp edge or surface that could tend to cut into cargo that engages the beam 40 during shipment, as well as to minimize any tendency to break or fracture (thereby creating a more sharp edge or point) during use. Similarly, one or more of the inner edges (such as the inner edges between the top wall 68 and the respective right or left side surface 72, 74, or the inner edge between the right or left rib 84, 85 and the respective right or left side wall 76, 78) may include a fillet or other rounded feature along the length thereof, which adds to the strength of the joint therebetween.

In some embodiments, the beam 40 may be formed from a single monolithic member, and may be formed from an extrusion or other process known to make uniform members along their length. In some embodiments, one or both of the right side surface 72 and the right wall 76 and the left side surface 74 and the left wall 78 may be substantially parallel to each other.

In some embodiments, portions of the top wall 68, one or both side walls 72, 74 or other structural features of the beam 40 may be locally thickened to increase the strength or resistance to bending at portions that normally carry a relatively larger load than other structural portions of the beam 40.

While the preferred embodiments of the disclosure have been described, it should be understood that the disclosure is not so limited and modifications may be made without departing from the disclosure. The scope of the invention is defined by the appended claims, and all devices that come within the meaning of the claims, either literally or by equivalence, are intended to be embraced therein.

The invention claimed is:

1. An elongate beam assembly for supporting cargo, comprising:
    an elongate beam extending between first and second ends, the beam comprising a bottom wall with a downward facing surface and extending across a bottom width, a top wall with an upwardly facing surface and extending across a top width between right and left edges, opposite right and left side walls extending between the bottom and top walls, wherein the bottom width is smaller than the top width, wherein each of the right and left edges of the top wall define respective right and left side surfaces, and further comprising right and left ribs that connect a bottom edge of each respective right and left side surface to the respective right and left side wall.

2. The elongate beam assembly of claim 1, wherein the combination of the top wall, the right side surface, the right rib, and the right side wall are interconnected to define a box-like structure, wherein the box-like structure is hollow.

3. The elongate beam assembly of claim 2, wherein the combination of the top wall, the left side surface, the left rib, and the left side wall are interconnected to define a box-like structure, wherein the box-like structure is hollow.

4. The elongate beam assembly of claim 1, wherein the beam includes a uniform cross-section along its length between the first and second ends.

5. The elongate beam assembly of claim 1, wherein a vertical height of the right side surface is between about 25% to 40% of a vertical height of the right side wall.

6. The elongate beam assembly of claim 1, wherein the elongate beam is symmetrical about a vertical plane extending through a center of the beam along the length of the beam.

7. The elongate beam assembly of claim 1, further comprising a first connector assembly in communication with the first end of the beam, the first connector assembly configured to removably engage a rigid support member, and a second connector assembly in communication with the second end of the beam, the second connector assembly configured to removably engage a second rigid support member.

8. The elongate beam assembly of claim 7, wherein each of the first and second connector assemblies include a tube that is telescopingly received within a central cavity of the beam, with the tube of the first connector extending into the central cavity through a first aperture on the first end, and the tube of the second connector extending into the central cavity through a second aperture on the second end.

9. The elongate beam assembly of claim 8, wherein the respective tubes of each of the first and second connectors include a longitudinal slot, which is in registry with a respective first or second aperture upon the beam, wherein a fastener is fixable through the respective first or second aperture and the respective longitudinal slot to fix a length of the beam assembly.

10. The elongate beam assembly of claim 9, wherein each of the first and second apertures upon the beam are disposed below each of the right and left side surfaces and the right and left ribs.

11. The elongate beam assembly of claim 1, wherein the top wall comprises a textured surface.

12. The elongate beam assembly of claim 1, wherein one of both of an edge between the top wall and the right side surface and a second edge between the right side surface and the right rib comprises a rounded or chamfered edge.

13. The elongate beam assembly of claim 1, wherein an edge between the right side wall and the right rib comprises a fillet.

14. The elongate beam assembly of claim 1, wherein an outward facing portion of a right side surface is parallel to an outward facing portion of the right side wall.

15. The elongate beam of claim 1, wherein the beam assembly is a single monolithic piece.

\* \* \* \* \*

UNITED STATES PATENT AND TRADEMARK OFFICE
CERTIFICATE OF CORRECTION

| | | |
|---|---|---|
| PATENT NO. | : 8,740,526 B2 | Page 1 of 1 |
| APPLICATION NO. | : 14/055290 | |
| DATED | : June 3, 2014 | |
| INVENTOR(S) | : Howard T. Knox | |

It is certified that error appears in the above-identified patent and that said Letters Patent is hereby corrected as shown below:

<u>In the Claims</u>

In column 6, claim 15, line 46, after "the elongate beam" insert --assembly--. (First occurrence)

In column 6, claim 15, line 47, before "is a single monolithic" delete "assembly".

Signed and Sealed this
Ninth Day of September, 2014

Michelle K. Lee
*Deputy Director of the United States Patent and Trademark Office*